United States Patent [19]
Balderson

[11] 3,943,484

[45] Mar. 9, 1976

[54] METHOD OF ATTENUATING UNWANTED SEISMIC REFLECTIONS IN UNDERWATER SEISMIC EXPLORATION

[75] Inventor: Vearle Spurlock Balderson, Dallas, Tex.

[73] Assignee: Avance Oil & Gas Company, Inc., Midland, Tex.

[22] Filed: Nov. 26, 1973

[21] Appl. No.: 418,964

[52] U.S. Cl............................ 340/7 R; 340/15.5 CP
[51] Int. Cl.²............................................ G01V 1/38
[58] Field of Search....... 340/7 R, 15.5 CP, 15.5 TC

[56] References Cited
UNITED STATES PATENTS

| | | | |
|---|---|---|---|
| 2,757,356 | 7/1956 | Haggerty | 340/7 R |
| 3,059,718 | 10/1962 | Clifford et al. | 340/15.5 CP |
| 3,278,893 | 10/1966 | Silverman | 340/7 R |
| 3,278,893 | 10/1966 | Silverman | 340/7 R |
| 3,350,683 | 10/1967 | Sengbush | 340/7 R |

*Primary Examiner*—Maynard R. Wilbur
*Assistant Examiner*—H. A. Birmiel
*Attorney, Agent, or Firm*—Giles C. Clegg, Jr.

[57] ABSTRACT

A string of seismic detectors is towed at a certain depth underwater by a survey boat over an area to be explored. A seismic disturbance is produced at a distance below the surface of the water such that the propagation time of seismic waves traveling from the disturbance and reflected from the water surface to the detectors is substantially the same as the propagation time of seismic waves traveling from the disturbance and reflected from the water floor to the detectors. Since the seismic waves reflected from the water surface are out of phase with those reflected from the water floor, the reflected waves tend to cancel or attenuate, thereby eliminating or minimizing these unwanted seismic signals.

3 Claims, 4 Drawing Figures

METHOD OF ATTENUATING UNWANTED SEISMIC REFLECTIONS IN UNDERWATER SEISMIC EXPLORATION

BACKGROUND OF THE INVENTION

This invention relates to underwater seismic exploration methods.

Seismic exploration contemplates the collection of data which will characterize or define subsurface geological formations. For land seismic exploration, such data is commonly obtained by producing a seismic disturbance (e.g., detonating an energy charge) at or below the surface of the earth and then detecting and recording the resultant seismic waves which are reflected from the reflecting interfaces of the subsurface formations. An array of seismometers spaced at varying distances from the disturbance, is used to detect and record the seismic waves.

The seismic record—termed a seismogram—consists of a plurality of traces, each of which is generated by a different seismometer. Each trace is a time varying representation of the seismic waves received by the corresponding seismometer.

Although land and marine (hereinafter referred to as "underwater") seismic exploration involve many of the same techniques such as those described above, underwater exploration presents peculiar problems not generally found in land exploration. In underwater exploration, the seismic disturbance is generally produced below the surface of the water and the resulting seismic reflections are detected by a string of seismic detectors (such as hydrophones) towed underwater by a survey boat. The seismic detectors typically are submerged in a line behind the boat at a depth equal to about one fourth the wave length of a seismic wave.

One problem with underwater seismic exploration is the generation of certain undesirable seismic wave reflections which cause spurious and unwanted signals to be recorded on the seismogram. Two of such undesirable wave reflections are the water surface reflection (from the water/air interface), and the water floor reflection (from the water/land interface). These reflections may be of such magnitude and may arrive at such time as to obscure the desirable seismic waves reflected from the reflecting interfaces of the formations below the water floor.

SUMMARY OF THE INVENTION

It is an object of the present invention to provide a new and improved method of underwater seismic exploration which minimizes the effects of water surface and water floor seismic wave reflections.

It is also an object of the present invention to provide an underwater seismic exploration method in which water surface and water floor seismic wave reflections are substantially cancelled or attenuated.

These and other objects, features, and advantages of the present invention are realized in a specific illustrative method of conducting seismic exploration in which one or more seismic detectors are positioned at a certain distance below the surface of the water and a seismic disturbance is produced also below the surface of the water at a depth to cause the seismic waves reflected from the water surface and from the water floor to arrive at the detectors out of phase. In this manner, the water surface and water floor seismic wave reflections interfere and are attenuated to leave a more clear record of the seismic waves reflected from the reflecting interfaces of the formations below the water floor.

BRIEF DESCRIPTION OF THE DRAWINGS

A complete understanding of the present invention and of the above and other advantages thereof may be gained from a consideration of the following detailed description of an illustrative embodiment thereof presented in connection with the accompanying drawings in which.

DETAILED DESCRIPTION

Figure 1:
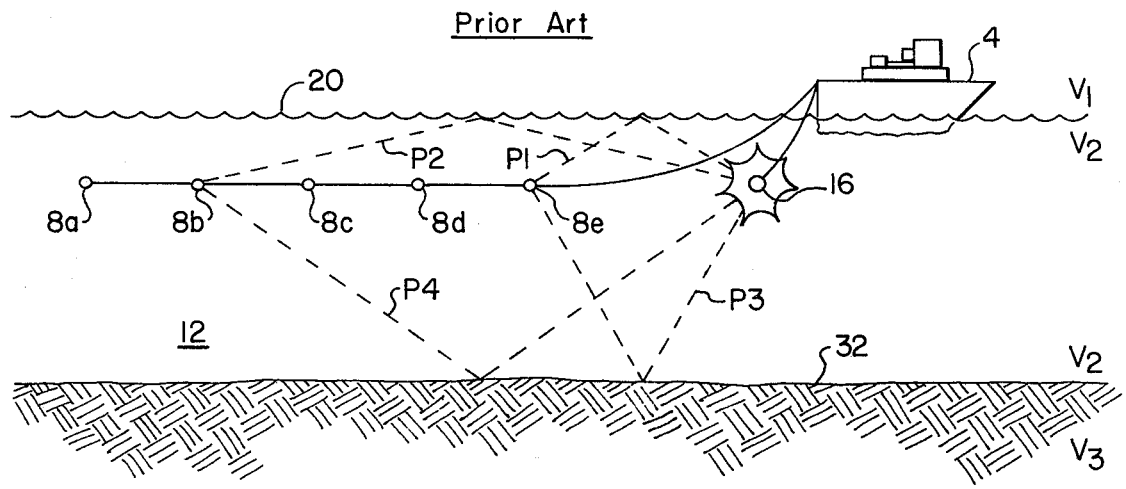
FIG. 1 is a diagrammatic view of a survey method conducted in accordance with the prior art.

FIG. 1 illustrates a prior art method of conducting underwater seismic exploration. With this method, a survey boat 4 tows a string of seismic detectors such as hydrophones $8a$ through $8e$ for detecting seismic waves created in the water 12. The seismic detectors $8a$ through $8e$ are positioned at a convenient depth under the water but near the surface thereof. A source of energy for producing a seismic disturbance is also towed behind the survey boat 4 at about the same depth as the seismic detectors $8a$ through $8e$. When the energy source 16 is activated, a seismic disturbance is produced causing seismic waves to emanate from the energy source. Some portions of these waves are reflected from the water surface 20, as illustrated by seismic wave $p1$ and $p2$, toward the seismic detectors $8a$ through $8e$. (Although seismic waves emanate outwardly in all directions from a seismic disturbance, it is convenient to discuss seismic wave pathways to indicate the path traversed by that portion of a seismic wave which encounters a seismic detector). In addition, some portions of the seismic waves are reflected from the water floor 32, as illustrated by the pathways $p3$ and $p4$, and directed toward seismic detectors $8a$ through $8e$. Although not shown, a seismic wave may alternately be reflected multiple times from the water surface and water floor before arriving at a hydrophone. Such multiple reflections are referred to as reverberations. Finally, some portions of the waves (not shown) are transmitted to and reflected from subsurface formations below the water floor 32, and detected by the seismic detectors $8a$ through $8e$. It is these latter reflections which provide the desired information, with the water surface and water floor reflections and reverberations tending to obscure this information.

As is well known in the seismic exploration art, when a seismic wave traveling in a first medium is reflected from an interface between that first medium and a second medium, and the product of the seismic wave velocity in the first medium and the density of that medium is *greater* than the product of the seismic wave velocity in second medium and the density of the second medium, then a phase reversal of 180° occurs upon reflection. When a seismic wave traveling in a first medium is reflected from an interface between the first medium and a second medium, and the corresponding product for the first medium is *less* than that for the second medium, then no phase reversal occurs upon reflection. A phase reversal occurs, for example, when a rarefaction of a wave is reflected from an interface as a compression. The present invention utilizes this characteristic of seismic waves to effectively cancel or attenuate undesirable water surface and water floor reflections and reverberations such as those illustrated and discussed in FIG. 1.

Figure 2:
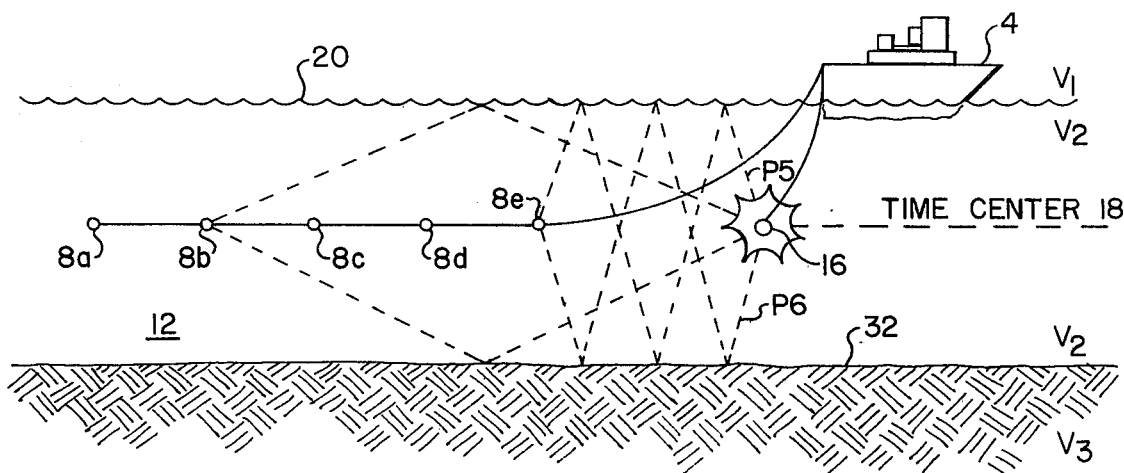
FIG. 2 is a diagrammatic view of a survey method conducted in accordance with the present invention.

FIG. 2 diagrammatically shows an illustrative method for conducting seismic exploration in accordance with the present invention. This method contemplates the positioning of a seismic source 16 and a string of seismic detectors 8a through 8e at a depth corresponding to the "seismic wave time center" (indicated by numeral 18) between the water surface 20 and the water floor 32. The seismic wave time center is defined as a locus of points between the water surface 20 and the water floor 32 from which the vertical seismic wave travel time to the water floor is the same as the vertical seismic wave travel time to the water surface. In other words, a reflection from the water surface 20 of a seismic wave produced by the seismic source 16 will arrive at the seismic wave time center at the same time as a reflection of the same wave from the water floor 32 as will all subsequent reverberations of this wave. The seismic wave time center is approximately midway between the water surface 20 and the water floor 32, but because propagation times at greater water depth may be slightly different from propagation times at lesser water depths, the seismic wave time center may not coincide exactly with a depth of one half the distance from the water surface 20 to the water floor 32.

It might also be noted here that what has been referred to as the "water floor" should be understood to be the interface between the water and consolidated rock at which the primary seismic wave reflection occurs, i.e., at which a significant change in the seismic wave velocity occurs. For example, there may be a layer of mud over the "water floor" which is composed mostly of water such that there is no significant change in the seismic wave velocity in the mud. The water floor in this case would not be the interface between the water and the mud, but rather would be below the mud where the primary reflection from the water/land interface occurred.

As mentioned earlier, seismic waves traveling from the seismic source 16 and reflected from the water surface 20 undergo a 180° reversal. Thus, in FIG. 2, a seismic wave reflection from the water surface 20 arriving at the seismic wave time center (where the seismic detectors are positioned) will be 180° out of phase with a seismic wave reflection from the water floor 32 arriving at the time center. Similarly, reverberations of such wave will arrive at the time center out of phase. With the reflections being out of phase, each reflection tends to cancel or at least attenuate the other reflection. The amplitude of the resultant of the water surface and water floor seismic wave reflections is thus either zero or fairly small and interference with desirable reflections is diminished.

FIG. 2 illustrates reverberations of a seismic wave from the seismic source 16 to the first seismic detector 8e. Pathway p5 of the wave is reflected twice from the water surface 20 and once from the water floor 32 whereas pathway p6 is reflected once from the water surface 20 and twice from the water floor 32. Note that for pathway p5, two phase reversals occur whereas for pathway p6 one phase reversal occurs so that the water reflections arriving at the seismic detectors are out of phase. From this, it is clear that water surface and water floor reflections from the seismic source 16 will arrive at the seismic detectors out of phase regardless of the number of reflections (reverberations) which occur.

Figure 3A:
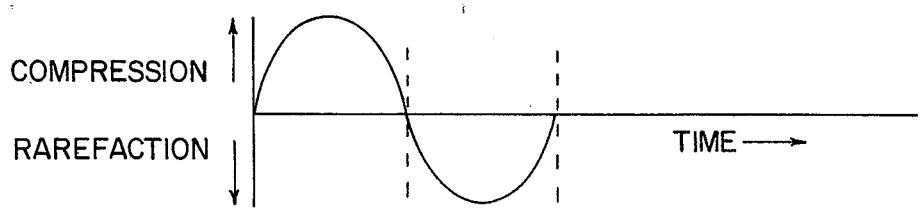
FIG. 3A graphically shows a seismic wave reflected from the water floor.
Figure 3B:
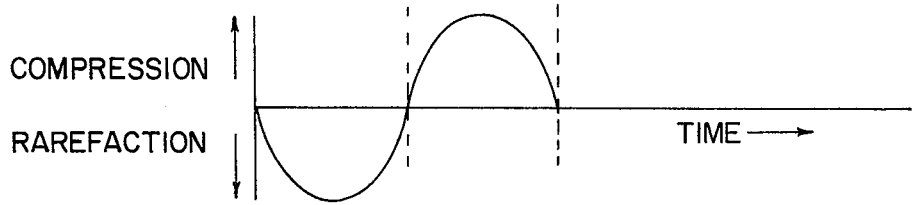
FIG. 3B graphically shows a seismic wave reflected from the water surface.

FIGS. 3A and 3B illustrate time varying seismic waves which are of substantially the same amplitude and 180° out of phase with each other. It is clear from the FIGS. that if the seismic waves represented therein arrive at a detector at the same time, the waves will substantially cancel each other so that neither would be detected or recorded.

In the manner described, undesirable seismic wave reflections and reverberations from the water surface and water floor will be attenuated so as to interfere little with the detection of desirable reflections from the reflecting interfaces of formations below the water floor. These desirable reflections are detected by the seismic detectors 8a through 8e and recorded by seismometers coupled to the seismic detectors and located on the vessel 4.

It is to be understood that the above-described method is only illustrative of the application of the principals of the present invention. Modifications may be devised by those skilled in the art without departing from the spirit and scope of the invention and the following claims are intended to cover such modifications.

I claim:

1. A method of conducting seismic exploration in water covered areas comprising:

positioning a seismic detector below the surface and above the bottom of a water layer at about the seismic wave time center, producing a seismic disturbance below the surface of the water at about the seismic wave time center which generates seismic waves which will penetrate and be reflected from subsurface strata and also be reflected between the surface and bottom of the water layer to produce reverberations, detecting the reflected seismic waves in said seismic detector, said seismic detector being of a character that reflections of a seismic wave from the surface and bottom of the water layer will cancel and only be detected at reduced amplitudes, and recording the detected seismic energy.

2. A method as defined in claim 1 wherein said seismic detector is towed through the water layer.

3. A method as defined in claim 1 wherein a plurality of spaced apart seismic detectors are towed through the water layer at about the seismic wave time center.

* * * * *